United States Patent [19]
Van Driel et al.

[11] Patent Number: 5,581,554
[45] Date of Patent: Dec. 3, 1996

[54] MULTIPLE ACCESS TELECOMMUNICATION NETWORK

[75] Inventors: Carel J. L. Van Driel; Atul N. Sinha, both of Eindhoven, Netherlands

[73] Assignee: U.S. Philips Corporation, New York, N.Y.

[21] Appl. No.: 359,365

[22] Filed: Dec. 20, 1994

[30] Foreign Application Priority Data

Dec. 24, 1993 [BE] Belgium ................................. 9301459

[51] Int. Cl.⁶ ..................................................... H04J 1/05
[52] U.S. Cl. .......................... 370/482; 370/344; 370/468
[58] Field of Search ................................. 370/9, 69.1, 50, 370/121, 71, 95.1, 95.3, 85.7, 84; 375/238, 239; 455/17, 21, 23, 33.1, 37.1, 54.1, 44

[56] References Cited

U.S. PATENT DOCUMENTS

| | | | |
|---|---|---|---|
| 4,385,377 | 5/1983 | Norris et al. ................................. | 370/9 |
| 4,999,831 | 3/1991 | Grace ......................................... | 370/50 |
| 5,411,536 | 5/1995 | Armstrong ................................. | 375/239 |

FOREIGN PATENT DOCUMENTS 3313840  10/1984  Germany.

OTHER PUBLICATIONS

"A European Initiative Leading Towards a Practical Customer Access Link Link Using Fibre", D. E. A. Clarke, R. Mudhar and A. Purser. Jan. 1993 pp. 120–126.

Primary Examiner—Douglas W. Olms
Assistant Examiner—Ajit Patel
Attorney, Agent, or Firm—Michael E. Marion

[57] ABSTRACT

In a multiple access network, signals transmitted by a plurality of secondary stations to a primary station are to be distinguished by the primary station. One method for realizing this is by the use of Sub-Carrier Multiple Access (SCMA). According to the method of SCMA, a transmit signal is modulated on a subcarrier having its own frequency and then amplitude modulated on a main carrier in each secondary station. To reduce a mutual disturbance by the secondary stations in SCMA, according to the present invention, a transmit signal is converted into high-speed bursts of a transmit signal. As a result, fewer secondary stations on average are active, so that the mutual disturbance by the secondary stations will diminish.

7 Claims, 3 Drawing Sheets

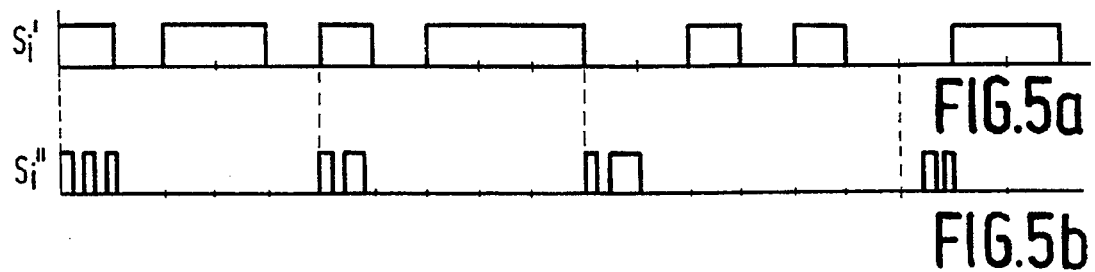
FIG.5a
FIG.5b
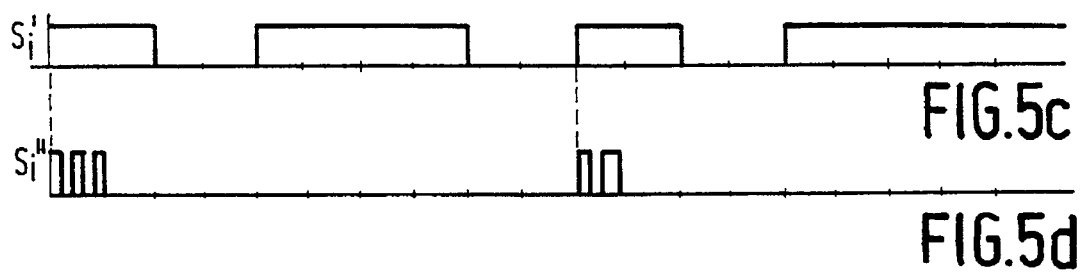
FIG.5c
FIG.5d
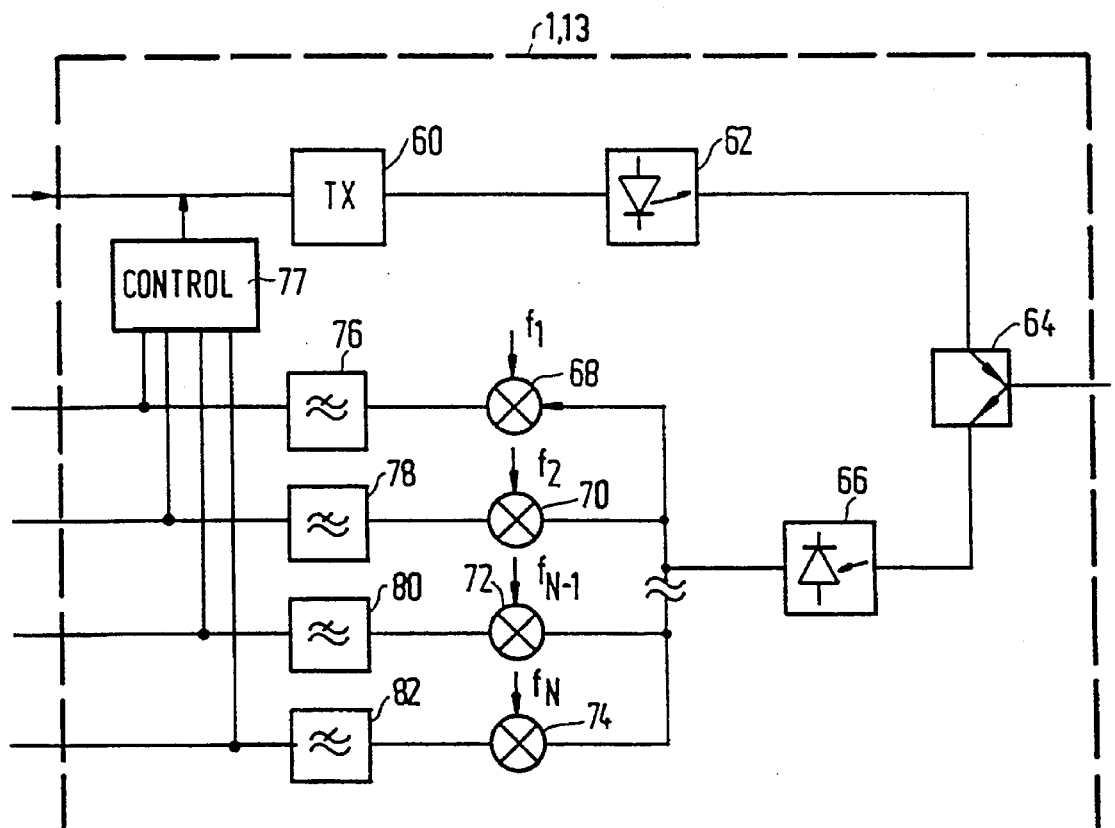
FIG.6

MULTIPLE ACCESS TELECOMMUNICATION NETWORK

BACKGROUND OF THE INVENTION

1. Field of the Invention

The invention relates to a telecommunication network comprising a plurality of secondary stations coupled to a primary station via a channel that is shared at least partly, said secondary stations comprising a modulator for generating and supplying to the channel a carrier modulated with an auxiliary signal, the auxiliary signal comprising a digital transmit signal modulated on a subcarrier, the frequency of the subcarrier being different for different secondary stations, the primary station comprising a demodulator for deriving at least a reconstituted digital transmit signal from a signal received from the channel.

The invention likewise relates to a telecommunication station to be used in said telecommunication network.

2. Discussion of the Related Art

A telecommunication network as defined in the opening paragraph is known from the journal article "A European initiative leading to a practical customer access link using fibre" by D. E. A. Clarke, R. Mudhar and A. Purser in British Telecom Technology Journal, Vol. 11, No. 1, January 1993.

Such telecommunication systems are used for the communication between a primary station and a plurality of secondary stations via a channel used in common by the secondary stations. This channel may be formed, for example, by a glass fibre, a coaxial cable or a radio link. Applications of such communication systems are, for example, passive optical networks, local area networks, systems for satellite communication and mobile telephony systems.

In telecommunication networks which utilize a common channel for the secondary stations there is to be ensured that no or only little mutual disturbance arises as a result of secondary stations simultaneously transmitting information to the primary station.

In general, this may be effected by giving the signals from each secondary station its own frequency, so that the signals coming from the different secondary stations can be separated by frequency selective filters at the primary station. Another option is to render different time slots in a frame available which are different for each secondary station, so that only one single secondary station at a time can transmit a signal to the primary station.

A simple alternative to said methods is the telecommunication network known from said journal article, in which secondary stations are used which generate a carrier modulated on an auxiliary signal, while the carrier frequency for the different secondary stations may be about the same. This carrier is, for example, amplitude (or intensity) modulated, frequency modulated or phase modulated by an auxiliary signal in its turn obtained by the modulation of a digital signal on a subcarrier. The subcarrier is then different for the different secondary stations.

The receiver in the primary station comprises a demodulator for demodulating and separating signals coming from the different secondary stations. Separating the signals coming from the different secondary stations may be effected, for example, by bandpass filters or synchronous detectors followed by low-pass filters.

In said journal article there is mentioned that other secondary stations can be expected to cause disturbance to the signal coming from a specific secondary station. This disturbance is caused by interference from different carriers which have about the same frequency in the receiver of the primary station. The power of this interference depends, amongst other things, on the bandwidth of the auxiliary signal, the spectral bandwidth of the carrier, the carrier frequency differences of different secondary stations and on the number of secondary stations. The disturbance enhances as the number of secondary stations rises and decreases as the frequency difference between different carriers and the spectral bandwidth of the carrier become greater.

In practice the maximum transmission capacity of such a known telecommunication network is constrained by this mutual disturbance of signals coming from different secondary stations.

SUMMARY OF THE INVENTION

It is an object of the invention to provide a telecommunication network as defined in the opening paragraph in which the mutual disturbance by secondary stations is reduced considerably. For this purpose, the invention is characterized in that the digital transmit signal comprises data bursts and the instantaneous transmission rate of the digital transmit signal during the data bursts is higher than the average transmission rate of the digital transmit signal.

By transmitting the digital signal in the form of data bursts in lieu of continuous transmission there is achieved that the average number of active secondary stations is reduced considerably. The average number of active stations is reduced by a factor equal to the ratio of the instantaneous transmission rate of the digital signal during the data bursts to the average transmission rate of the digital signal. As a result of the reduction of the average number of active secondary stations, the mutual disturbance caused by the secondary stations is reduced as well.

An embodiment of the invention is characterized in that the average transmission rate of the digital transmit signal is different for a number of secondary stations and in that the instantaneous transmission rate for these secondary stations is the same during the data bursts.

In this manner the primary station only needs to be arranged for receiving data bursts which have a specific transmission ram, whereas it is still possible for the transmission rates of the secondary stations to be different. It is noted that in the transmission system according to the invention, contrary to the TDMA systems, it is not necessary for the data bursts coming from different secondary stations to be synchronized with each other.

BRIEF DESCRIPTION OF THE DRAWINGS

The invention will now be further explained with reference to the drawings in which like reference characters represent like elements, in which:

FIG. 5a–5d shows graphs of the signals $S_i'$ and $S_i''$ plotted against time for two different values of the average transmission rate; and FIG. 6 shows a primary station to be used in the telecommunication network according to the invention.

DETAILED DESCRIPTION OF THE PREFERRED EMBODIMENTS

Figure 1:
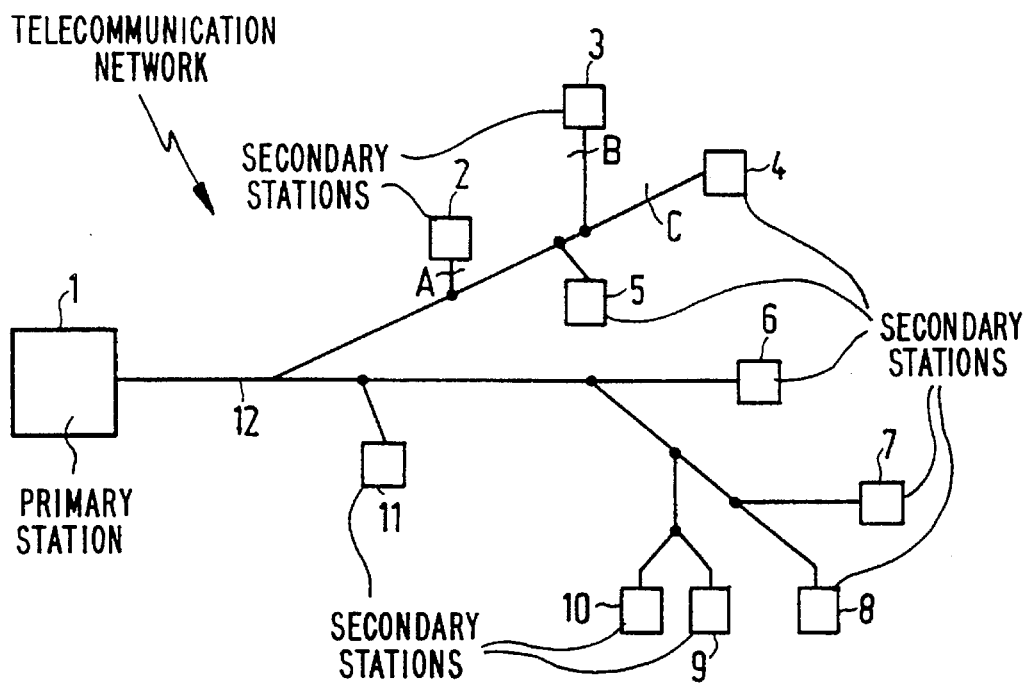
FIG. 1 shows a passive optical network in which the invention can be implemented.

The telecommunication network shown in FIG. 1 comprises a primary station 1 connected to the secondary stations 2 to 11 by a channel in this case formed by a glass fibre network 12. The light transmitted by the primary station 1 is split up at the junctions to be further distributed v/a the network to the secondary stations 2 to 11. Light signals transmitted by the secondary stations are combined at the junctions to a combined light signal and sent to the primary station.

Figure 2:
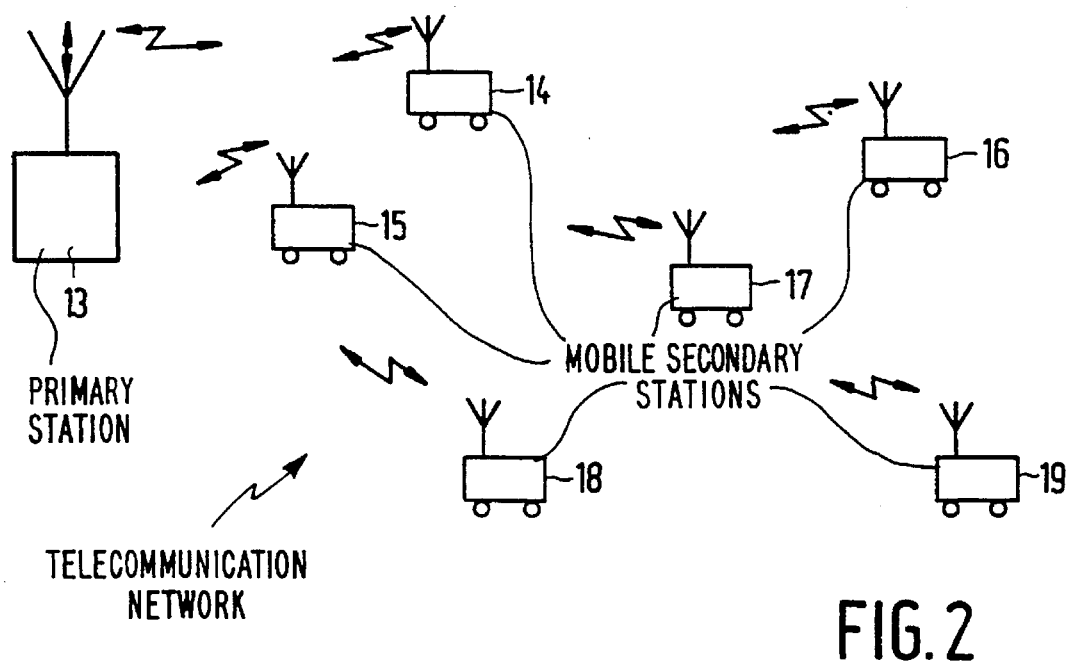
FIG. 2 shows a telecommunication network for mobile communication in which the invention can be implemented.

The telecommunication network as shown in FIG. 2 comprises a primary station 13 which can exchange information with a plurality of mobile secondary stations 14 to 19 by the channel formed here by a radio link.

As all the secondary stations occurring both in the network shown in FIG. 1 and in the network shown in FIG. 2 utilize a common channel, these networks need to have measures for avoiding mutual disturbance caused by different secondary stations transmitting simultaneously.

Figure 3:
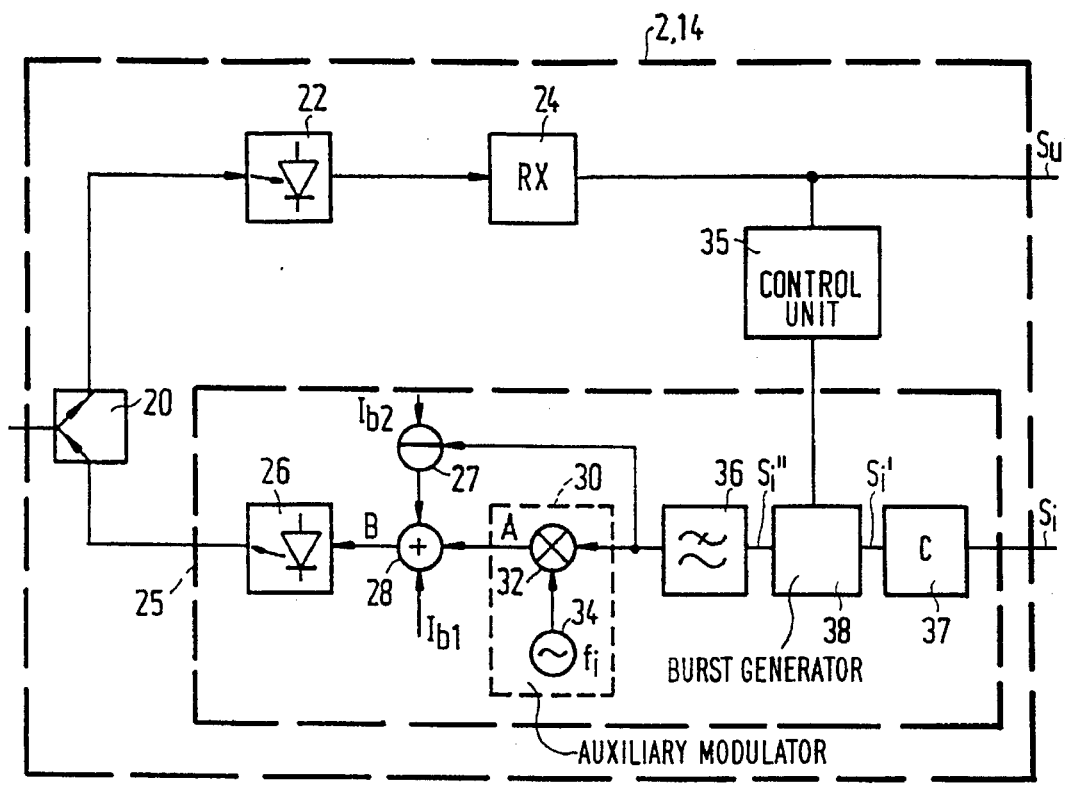
FIG. 3 shows a secondary station to be used in a telecommunication network according to the invention.

In the secondary station 2 shown in FIG. 3 the input signal $S_i$ is applied to a transmitter 25. In the transmitter 25 the input signal $S_i$ is applied to a coder 37. The output of the coder 37, which carries output signal $S_i'$, is connected to a first input of a burst generator 38. The output of the burst generator 38, which carries the digital transmit signal $S_i''$ for its output signal, is connected to an input of a low-pass filter 36. The output of the low-pass filter 36 is connected to an input of an auxiliary modulator 30. The auxiliary modulator 30 comprises an oscillator 34 for generating the subcarrier having a frequency $f_i$. The input of the auxiliary modulator 30 is formed by a first input of a multiplier circuit 32. The output of the oscillator 34 is connected to a second input of the multiplier circuit 32. The output of the multiplier circuit 32, likewise forming the output of the auxiliary modulator 30, is connected to a first input of an adder circuit 28. A constant value $I_{b1}$ is applied to a second input of the adder circuit 28, while a third input of the adder circuit 28 is supplied with a value $I_{b2}$ coming from a controllable current source 27. The controllable current source 27 is controlled by the output signal of the low-pass filter 36. The output of the adder circuit 28 is connected to an input of a modulator, in this case formed by an electrooptical converter 26. The output of the electrooptical converter 26, which cartes the transmit signal for its output signal, is connected to a first input of an optical duplexer 20. One output of the optical duplexer 20 is connected to an optoelectrical converter 22 whose output is connected to an input of a receiver 24. The output of the receiver 24 is connected to an input of a control unit 35. Furthermore, an output signal $S_u$ is available on the output of the receiver 24. A first output of the control unit 35 is connected to a second input of the burst generator 38.

In the embodiment shown in FIG. 3 the input signal $S_i$ is converted into a coded signal $S_i'$ by the coder 37. According to the inventive idea the burst generator 38 converts the coded signal $S_i'$ into data bursts which have an increased transmission rate. Furthermore, there is assumed that the transmit signal contains digital symbols whose binary "0" and "1" values are represented by voltages having the respective values 0 and +V. On the output of the auxiliary modulator there is then an auxiliary signal available formed by a subcarrier amplitude-modulated on the filtered transmit signal $S_i''$ and having a frequency $f_i$. The frequency of the subcarrier is usually different for different secondary stations. Alternatively, it is possible that a combination of Time Division Multiple Access (TDMA) and Sub-Carrier Multiple Access (SCMA) occurs where different secondary stations transmit in different time slots in a frame, so that it is possible that the same subcarrier frequency is selected for a number of secondary stations. During a data burst in the signal $S_i''$, the current source 27 supplies additional current $I_{b2}$ to the adder circuit 28, so that the adder circuit 28 adds a value $I_{b1}+I_{b2}$ to the modulated carrier. The value of $I_{b2}$ is selected to exceed or be equal to the amplitude of the modulated subcarrier, so that the minimum value of the input signal of the electrooptical converter 26 is equal to $I_{b1}$. If the subcarrier is switched off by the signal $S_i''$, (no data burst), the current supplied by the current source 27 is reduced and, as a result, the input signal of the electrooptical converter 26 is then reduced to the quiescent value $I_{b1}$. The low-pass filter 36 limits the bandwidth of the output signal of the burst generator 38, so that the bandwidth of the transmit signal is limited. In the situation described here the input signal of the electrooptical converter is converted into variations of intensity of the optical signal. The electrooptical converter 26 sends the optical transmit signal to the channel via the duplexer 20. By reducing the signal B on the input of the electrooptical converter, the amplitude of the transmit signal is also reduced, so that the mutual disturbance caused by secondary stations is reduced.

A signal received from the channel is applied to an optoelectrical converter 22 via the duplexer 20. From the output signal of the optoelectrical converter 22 the receiver 24 recovers the signal $S_u$ intended for a particular station. Since the channel is the same for all the secondary stations, the signals intended for the different secondary stations are transmitted in a multiplexed mode. This may be effected by means of time-division multiplexing, frequency-division multiplexing or by sub-carrier multiplexing or a combination thereof.

The control unit 35 is capable of sending commands to the burst generator 38. They may be commands to set the period of time and/or repetition ram of the transmit data burst, to obtain a desired average transmission rate for the signal $S_i'$. Alternatively, it is possible that the control unit 35 sends control signals intended for the primary station via the burst generator 38. Such signals may be, for example, a request to the primary station for permission to increase the average transmission rate, or an announcement that the secondary station is going to decrease the average transmission rate. The request for permission to increase the transmission rate may find its origin, for example, in that a terminal unit that needs more transmission capacity is turned on.

The control unit 35 is also capable of receiving control signals from the primary station. They may be signals indicating that a particular secondary station is permitted to increase its average transmission rate, or that a particular second station is to reduce its average transmission rate, for example, to render transmission capacity available for another secondary station that has a higher priority.

Figure 4:
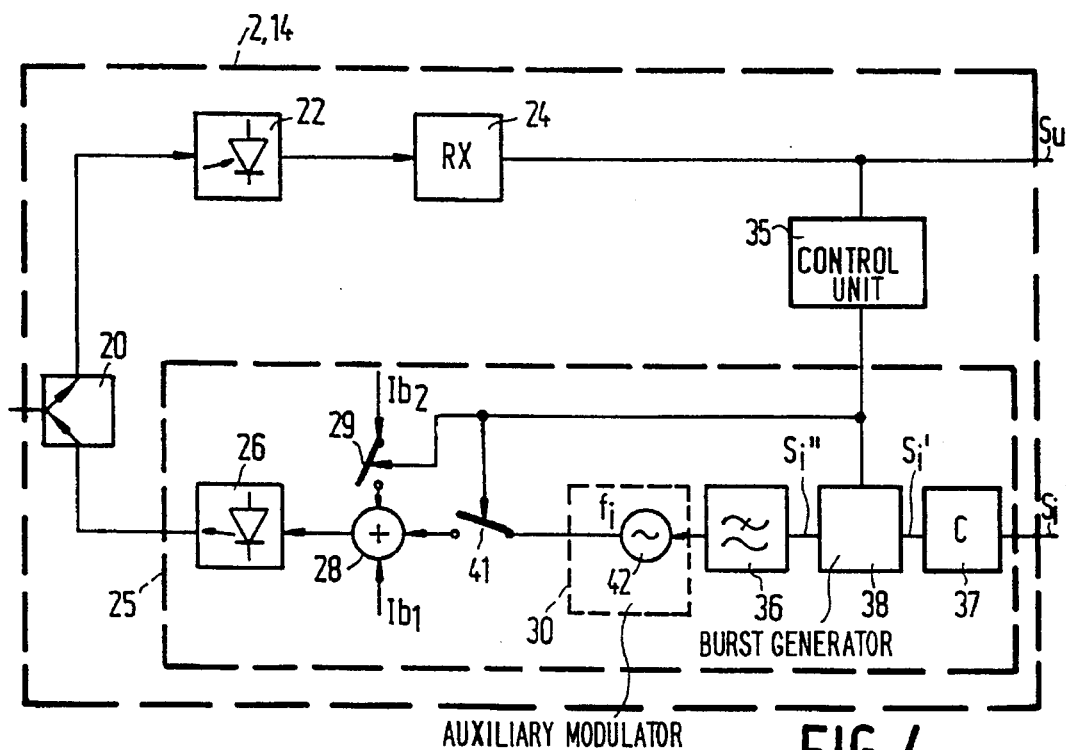
FIG. 4 shows an alternative embodiment for a secondary station to be used in a telecommunication network according to the invention.

In the secondary station 2 shown in FIG. 4 the input signal $S_i$ is applied to a transmitter 25. In the transmitter 25 the input signal $S_i$ is applied to a coder 37. The output of the coder 37, which carries output signal $S_i'$, is connected to a first input of a burst generator 38. The output of the burst generator 38, which carries output signal $S_i''$, is connected to an input of a low-pass filter 36, the output of the low-pass filter 36 being connected to an input of an auxiliary modulator 30. The auxiliary modulator 30 comprises an oscillator for generating a subcarrier which has an average frequency $f_i$ that can be frequency modulated by the input signal of the auxiliary modulator. For this purpose, the auxiliary modulator 30 comprises a frequency-controlled oscillator 42. The output of the auxiliary modulator 30 is connected via a switch 41 to a first input of an adder circuit 28. A constant value $I_{b1}$ is applied to a second input of the adder circuit 28, while a constant value $I_{b2}$ is applied to a third input of the adder circuit via a switch 29. The switches 29 and 41 are controlled by a control signal coming from the burst generator 38, which signal indicates that there is a data burst available on the output of the burst generator 38. The output of the adder circuit 28 is connected to an input of a modulator in this case formed by an electrooptical converter 26. The output of the electrooptical converter 26, carrying the transmit signal, is connected to a first input of an optical duplexer 20. An output of the optical duplexer 20 is connected to an optoelectrical converter 22 whose output is connected to the input of a receiver 24. On the output of the receiver 24 there is an output signal $S_u$ available.

The output of the receiver 24 is connected to an input of a control unit 35. A first output of the control unit 35 is connected to a second input of the burst generator 38.

In the embodiment shown in FIG. 4 the input signal $S_i$ is converted into a coded signal $S_i'$ by a coder 37. The burst generator 38 converts according to the inventive idea the coded signal $S_i'$ into data bursts which have an increased transmission rate.

The auxiliary modulator 30 generates a subcarrier modulated in response to the transmit signal $S_i''$. The modulated subcarrier may, for example, be amplitude modulated, frequency modulated or phase modulated. Combinations of these modulation methods, such as Quadrature Amplitude Modulation QAM are also possible. This is effected by applying to a modulation input of a voltage-controlled oscillator 42 a signal $S_i$ either coded or not by a coder 37. If a data burst is transmitted, the switches 29 and 41 are closed and the input of the electrooptical converter 26 carries a signal that consists of the sum of the modulated subcarrier and a constant value $I_{b1}+I_{b2}$. If no payload is transmitted, the switches 29 and 41 are open and only a signal having a constant value $I_{b1}$ is applied to the electrooptical converter. This leads to the fact that in the absence of payload only a small signal needs to be transmitted by the electrooptical converter, so that the consequent disturbance continues to be limited.

It is conceivable that the quiescent value $I_{b1}$ is equal to zero. Generally, this leads to a reduced modulation rate, because the optoelectrical converter needs a certain amount of time for building up from a fully turned-off state. If this reduced modulation rate is permitted, it may be advantageous to turn off the optoelectrical converter completely if there is no auxiliary signal.

The coder 37 may, for example, be a pulse position coder. Such a pulse position coder converts a binary input signal, which may have a logic "0" or "1" value in each symbol period, into a pulse position modulated signal in which the information is coded by the position taken up by a single pulse in a number of symbol periods. For example, if groups of three symbols are converted into a pulse position coded signal, this coding is effected by letting the pulse in each of the eight possible combinations of the three binary symbols adopt one of eight possible disjunct positions over three symbol intervals of the input signal.

The use of pulse position coding requires a larger bandwidth, but also results in a shorter period of time on average in which the subcarrier, and thus the transmit signal, is switched on, so that the mutual disturbance by the secondary stations is reduced considerably.

The low-pass filter 36 provides a limitation of the bandwidth of the output signal of the coder 37, so that the bandwidth of the transmit signal is limited.

The receiving section of the secondary station shown in FIG. 4 is identical with the receiving section of the secondary station shown in FIG. 3 explained earlier. The connections and functions of the control unit 35 in FIG. 4 correspond to the connections and functions of the control unit 35 in FIG. 3.

FIG. 5a shows, plotted against time, part of a coded digital signal $S_i'$ as this may be available on the output of the coder 37, while the marks on the x-axis represent symbol intervals.

FIG. 5b shows, plotted against time, the output signal of burst generator 38 associated with the signal shown in FIG. 5a. FIG. 5b shows that the instantaneous transmission rate during the data burst is higher by a factor five than the average transmission rate. As a result, the output signal of the electrooptical converter 26 can be zero or substantially zero for four out of five symbol periods of the signal $S_i'$, so that the mutual disturbance by the secondary stations in this situation is reduced by a factor five.

FIG. 5c shows, plotted against time, a further coded signal which has a transmission rate that is half the transmission rate of the signal shown in FIG. 5a. The same scale is used as those used in FIGS. 5a and 5b.

FIG. 5d shows, plotted against time, the output signal of the burst generator 38, which output signal is associated to the signal shown in FIG. 5c. FIG. 5d shows that the instantaneous transmission rate during the data burst is higher by a factor ten than the average transmission rate. As a result, the output signal of the electrooptical converter 26 may be zero or substantially zero for nine out of ten symbol periods of the signal $S_i'$. In the examples shown in FIG. 5 the instantaneous transmission rate is constant during the data bursts and the desired average transmission rate is obtained by setting an appropriate repetition rate of the data bursts.

In the primary station shown in FIG. 6 the signals to be sent to the secondary stations are applied to a transmitter 60. The output of the transmitter 60 is connected to the input of an electrooptical converter 62 whose output is connected to an input of an optical duplexer 64.

A combined input/output of the optical duplexer is connected to the channel. An output of the optical duplexer 64 is connected to an optoelectrical converter 66 whose output is coupled to a first input of a plurality of mixer stages 68, 70, 72 and 74. A second input of each mixer stage is supplied with a local oscillator signal while this signal has a different frequency $f_i$, where $i=1 \ldots N$, for each mixer stage. The output of the mixer stage 68 is connected to an input of a low-pass filter 76; the output of the mixer stage 70 is connected to an input of the low-pass filter 78; the output of the mixer stage 72 is connected to the input of a low-pass filter 80 and the output of the mixer stage 74 is connected to the input of a low-pass filter 82. The outputs of the low-pass filters 76 . . . 82 are connected to corresponding inputs of a control unit 77, while the output of the control unit 77 is connected to an input of the transmitter 60.

The signals to be transmitted to the secondary stations by the primary station 1 are combined to a combined signal in the transmitter 60. This may be effected, for example, by time-division multiplexing or by modulating different signals on different subcarriers. The output signal of the transmitter 60 is convened into an optical signal by the electrooptical converter 62 which optical signal is supplied to the channel via the optical duplexer 64.

The optical signal coming from the channel is converted into an auxiliary signal by the optical converter 66 in which auxiliary signal the transmit signal is available modulated by each secondary station on its own subcarrier frequency. As the frequencies of the subcarriers applied to the mixer stages 68 . . . 74 correspond to the frequencies of the subcarriers used by the different secondary stations, the output of each filter 76 . . . 82 carries the signal of one of the secondary stations.

If the subcarriers in the secondary stations are amplitude modulated by the transmit signal, the output of each mixer stage carries a demodulated signal whose subcarrier frequency corresponds to the subcarrier in a particular secondary station. By removing all other frequency components situated above the maximum frequency of the data signals transmitted by the secondary stations by means of the low-pass filters 76 . . . 82, the output of each low-pass filter carries a signal coming from a particular secondary station. The control unit 77 is capable of receiving signals from each one of the secondary stations. As explained earlier, these signals may be, for example, requests for permission to increase the average transmission capacity of a particular secondary station. The signals transmitted to the secondary stations by the control unit 77 are, for example, signals to indicate that a particular secondary station obtains permission or not to increase its average transmission rate, or that a secondary station is to reduce its transmission rate for another secondary station.

For allocating an additional transmission rate to particular secondary stations, the maximum transmission rate is determined based upon the actually used transmission rate of each secondary station. For this maximum transmission capacity $Rmax_1$ there may be derived:

$$Rmax_1 = \frac{C \cdot f_1 \cdot g_1^2 \cdot N(N-1)}{\sum_{i=1}^{N} \sum_{\substack{j=1 \\ j \neq i}}^{N} g_i \cdot g_j \cdot f_i \cdot f_j} \quad (1)$$

In (1) C is a constant, $f_1$ is the ratio of the average transmission rate $R_1$ to the instantaneous transmission rate $R_b$ of the secondary stations during a data burst, $g_i$ is a measure of the power of the signal from the secondary station 1 received by the primary station, N is the total number of active sub-stations, $f_i$ ($f_j$) is the ratio of the average transmission rate to the instantaneous transmission rate of the secondary station i(j) and $g_i(g_j)$ is a measure for the power normalized to a reference value of the signal received by the primary station and coming from the secondary station i(j). The magnitudes f and g always vary between 0 and 1. The constant C is proportional to the spectral bandwidth of the unmodulated carriers of the secondary stations and inversely proportional to the signal-to-noise ratio necessary for the primary station, so that a certain bit error rate is not exceeded. If assuming that all the values of g are equal to 1, (1) passes to:

$$Rmax_1 = \frac{C \cdot f_1 \cdot N(N-1)}{\sum_{i=1}^{N} \sum_{\substack{j=1 \\ j \neq i}}^{N} f_i \cdot f_j} \quad (2)$$

For allocating transmission capacity to the different secondary stations, the actual value of $f_1$ for all the secondary stations 1 is determined in the primary station from:

$$f_1 = \frac{R_b}{R_1} \quad (3)$$

In addition, the value of $Rmax_1$ is determined for each of the secondary stations from the actual values of f for all the secondary stations. If for all the secondary stations 1 the value of $Rmax_1$ exceeds the actual value of $R_1$, sufficient transmission capacity is available for all the secondary stations.

If a particular secondary station k requests for permission to increase its transmission rate $R_k$, the control unit 77 in the primary station computes the values of $Rmax_1$ for all the other secondary stations based upon this increased transmission rate $R_k$. If the actual value of the transmission rate $R_1$ for all the secondary stations is smaller than the computed value of $Rmax_1$, the request may be granted and the secondary station is permitted to increase its transmission rate. However, if for some secondary stations the actual value of the transmission rate $R_1$ exceeds the computed value of $Rmax_1$, the request by the secondary station k cannot be granted unconditionally. If all the secondary stations have the same priority, the request from secondary station k is declined. If secondary station i has a higher priority than that of other active stations, the control unit 77 can request one or more other secondary stations that have a priority lower than that of the secondary station i to reduce their transmission rate $R_i$. The primary station continuously verifies whether the actual transmission rate $R_1$ of each of the secondary stations is lower than the value $Rmax_1$.

It is noted that in the secondary station the mixer stages 68 . . . 74 are basically arranged for demodulating amplitude modulated auxiliary signals. If other modulation methods are used for the auxiliary signals, the mixer stages need to be adjusted thereto. An optional arrangement that can be used for different modulation methods is arranging the mixer stages as quadrature mixer stages, so that a quadrature component and an in-phase component are available for each auxiliary signal. This makes it possible to demodulate also angle-modulated auxiliary signals when a suitable modulator is used.

We claim:
1. A telecommunication network comprising:
   a primary station; and
   a plurality of secondary stations coupled to said primary station via a common channel, said secondary stations each having a modulator, wherein the modulator comprises
   burst generator means for converting an input signal into a digital transmit signal containing data bursts, the digital transmit signal further having an average transmission rate corresponding to a repetition rate of the data bursts with time; and
   auxiliary modulator means for generating and supplying to the channel a carrier modulated with an auxiliary signal, the auxiliary signal comprising the digital transmit signal modulated on a subcarrier, the frequency of the subcarrier being different for different secondary stations, further wherein an instantaneous transmission rate of the digital transmit signal during the data bursts is higher than the average transmission rate of the digital transmit signal, and wherein
   said primary station comprises a demodulator for deriving at least a reconstituted digital transmit signal from a signal received from the channel.
2. The telecommunication network as claimed in claim 1, further wherein the average transmission rate of the digital transmit signal is different for a number of said secondary stations and wherein the instantaneous transmission rate for the number of said secondary stations is the same during the data bursts.

3. The telecommunication network as claimed in claim 2, still further wherein the data bursts from different secondary stations last equally long and wherein the repetition rate of the data bursts is proportional to an average transmission rate of a particular secondary station.

4. The telecommunication network as claimed in claim 2, still further wherein the data bursts from different secondary stations each have a similar repetition rate and wherein a time duration of the data bursts of a particular secondary station is proportional to an average transmission rate of the particular secondary station.

5. A telecommunication station having a modulator, said modulator comprising:

burst generator means for converting an input signal into a digital transmit signal containing data bursts, the digital transmit signal further having an average transmission rate corresponding to a repetition rate of the data bursts with time; and auxiliary modulator means for generating a carrier modulated with an auxiliary signal, the auxiliary signal comprising the digital transmit signal modulated on a subcarrier, wherein an instantaneous transmission rate of the digital transmit signal during the data bursts is higher than the average transmission rate of the digital transmit signal.

6. The telecommunication station as claimed in claim 5, wherein the data bursts have a fixed duration and wherein the repetition rate of the data bursts is proportional to an average transmission rate of said telecommunication station.

7. The telecommunication station as claimed in claim 5, wherein the data bursts have a fixed repetition rate and further wherein a duration of the data bursts is proportional to an average transmission rate of said telecommunication station.

* * * * *